June 28, 1960 L. P. THOMAS, JR 2,943,146

REMOTE CONTROL SYSTEM

Filed April 21, 1958 2 Sheets-Sheet 1

INVENTOR.
LUCIUS P. THOMAS, JR.
BY
W. H. Sprangle
ATTORNEY

REMOTE CONTROL SYSTEM

Filed April 21, 1958 2 Sheets-Sheet 2

INVENTOR.
LUCIUS P. THOMAS, JR.
BY
W. H. Sprague
ATTORNEY

United States Patent Office 2,943,146

Patented June 28, 1960

2,943,146

REMOTE CONTROL SYSTEM

Lucius P. Thomas, Jr., Haddonfield, N.J., assignor to Radio Corporation of America, a corporation of Delaware Filed Apr. 21, 1958, Ser. No. 729,981

9 Claims. (Cl. 178—6)

Figure 1:
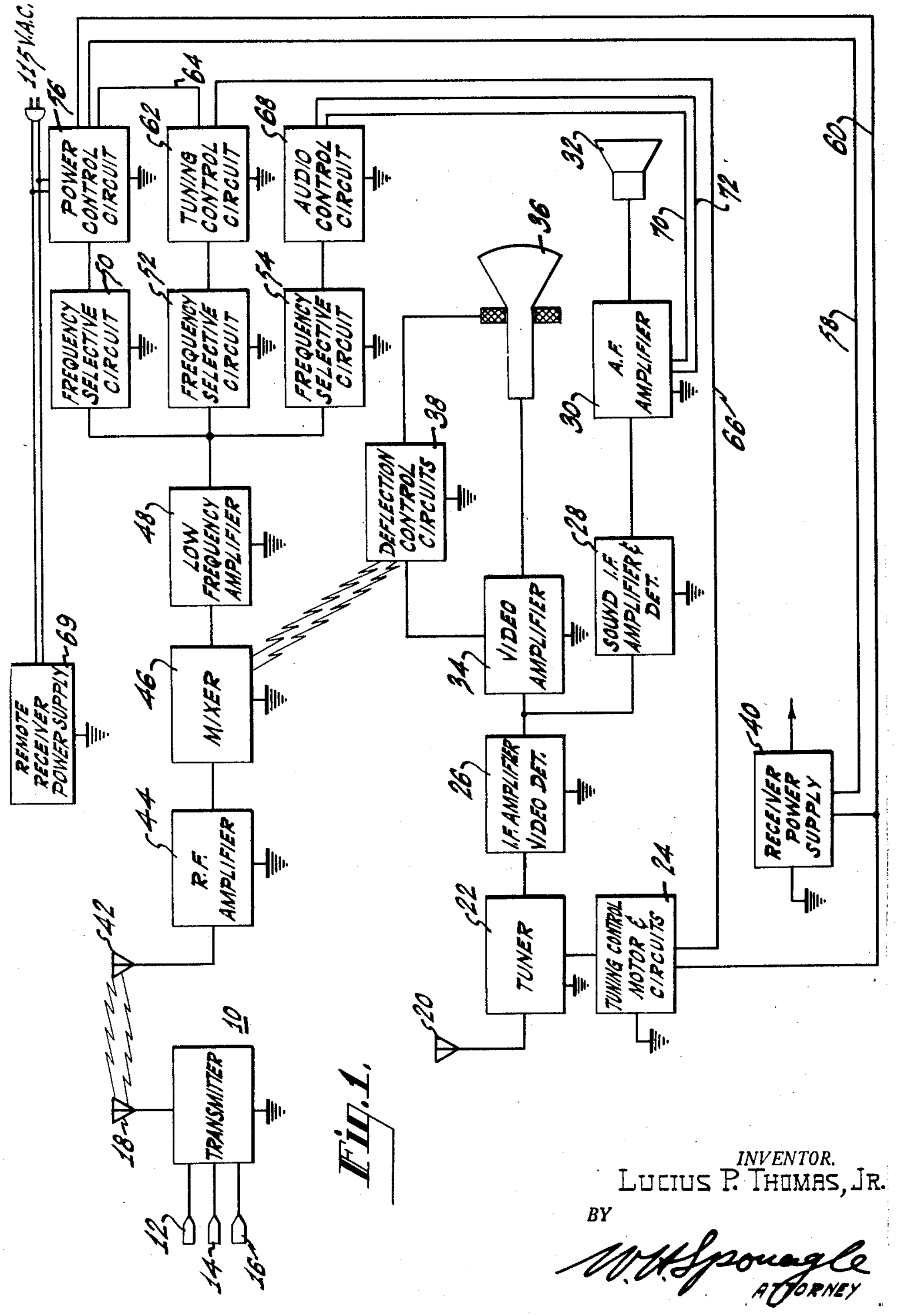

This invention relates to wireless remote control systems and more particularly to systems for the control of remotely located electronic equipment such as signal receivers.

Various types of wireless remote control systems have heretofore been proposed wherein a local transmitter is caused to radiate signal waves having predetermined frequency or modulation characteristics for reception by, and control of, remotely located apparatus. Systems of this type have been commonly used to control the operation of remotely located radio or television receivers thereby enabling the listener or viewer to adjust the tuning, volume, etc. without first moving to the receiver.

Where the remotely located apparatus comprises electronic equipment such as television receivers, signals radiated from this equipment may be within or near the frequency range of the transmitted control signals. This poses a difficult problem in selecting a location of the antenna for the remote control receiver to prevent these radiations from erroneously actuating the controlled circuits.

Another problem encountered in the design of wireless remote control systems is that the control transmitter will not always be located at the same distance from the remote equipment to be controlled, resulting in large variations in the signal strength at the remote location. Since different control signal frequencies are ordinarily used to actuate the different functions to be controlled at the remote location, the receiver for the control signal must be sufficiently selective so that particularly strong control signals will not be effective to actuate other than the intended function. Furthermore, the control signal receiver should be substantially immune to random noise having freqencies corresponding to those of the various control signals. Heretofore, receivers capable of providing the desired noise immunity and selectivity between the different control signal frequencies have been complex and expensive to build, and critical to adjust for proper operating conditions.

Accordingly, it is an object of this invention to provide an improved wireless remote control system.

It is a further object of this invention to provide an improved wireless remote control system for electronic apparatus wherein the remotely controlled apparatus is substantially immune to undesired actuation by stray signals radiated in the vicinity of such apparatus.

Another object of this invention is to provide an improved and simplified wireless remote control receiver exhibiting a high degree of selectivity between different control signal frequencies so that large amplitude control signals are effective only to activate the desired control function.

Still another object of this invention is to provide an improved and simplified remote control receiver exhibiting a high degree of noise immunity whereby random noise having frequencies corresponding to the frequencies of the various control signals are substantially ineffective to actuate the controlled circuits.

In accordance with the invention, the remote control receiver operates on a superheterodyne principle, wherein one of the stray signals radiated in the vicinity of the equipment to be controlled is used as the heterodyne signal. A received control signal wave from the remote control transmitter is heterodyned with this stray signal to produce a beat signal corresponding in frequency to the intermediate frequency of the control signal receiver. The frequencies of the control signals are selected so that the frequency of each of the beat signals is different for each function to be controlled. In this manner, the problems attendant with locating the remote antenna are materially reduced.

The control signal receiver includes one or more frequency selective circuits each tuned to a different frequency. When a beat signal is applied to these circuits, a control voltage is produced in the circuit which is tuned to the frequency of the beat signal. This control voltage is then applied to suitable circuit means for actuating one of the circuits to be controlled. Since it is probable that the other frequency selective circuits are also responsive, although to a much smaller extent to this beat frequency signal, a control voltage of smaller amplitude will also be produced from these circuits. Thus, if the received signal is of excessive amplitude, voltages built up across the respective selective circuits could cause keying of more than one of the amplifying devices, thereby resulting in undesired actuation of other control functions. Another cause of undesired actuation of the control functions is random noise which has frequencies in the range of the control signals.

Further in accordance with the invention the beat signal fed to the various frequency selective circuits is also fed to a selectivity control circuit where it is rectified to produce a second control signal of opposite sense to that provided by the various frequency selective circuits. The second control signal is also fed to the means for actuating the circuits to be controlled to counteract the effect of the smaller amplitude control signals from the frequency selective circuits. Since the control signal from the frequency selective circuit which is tuned to the beat frequency signal will be much larger in magnitude, the counteracting effect of the second control signal will be negligible. This not only effectively enhances the selectivity of the control signal receiver circuit for stronger signals, but substantially improves the noise immunity thereof.

Figure 2:
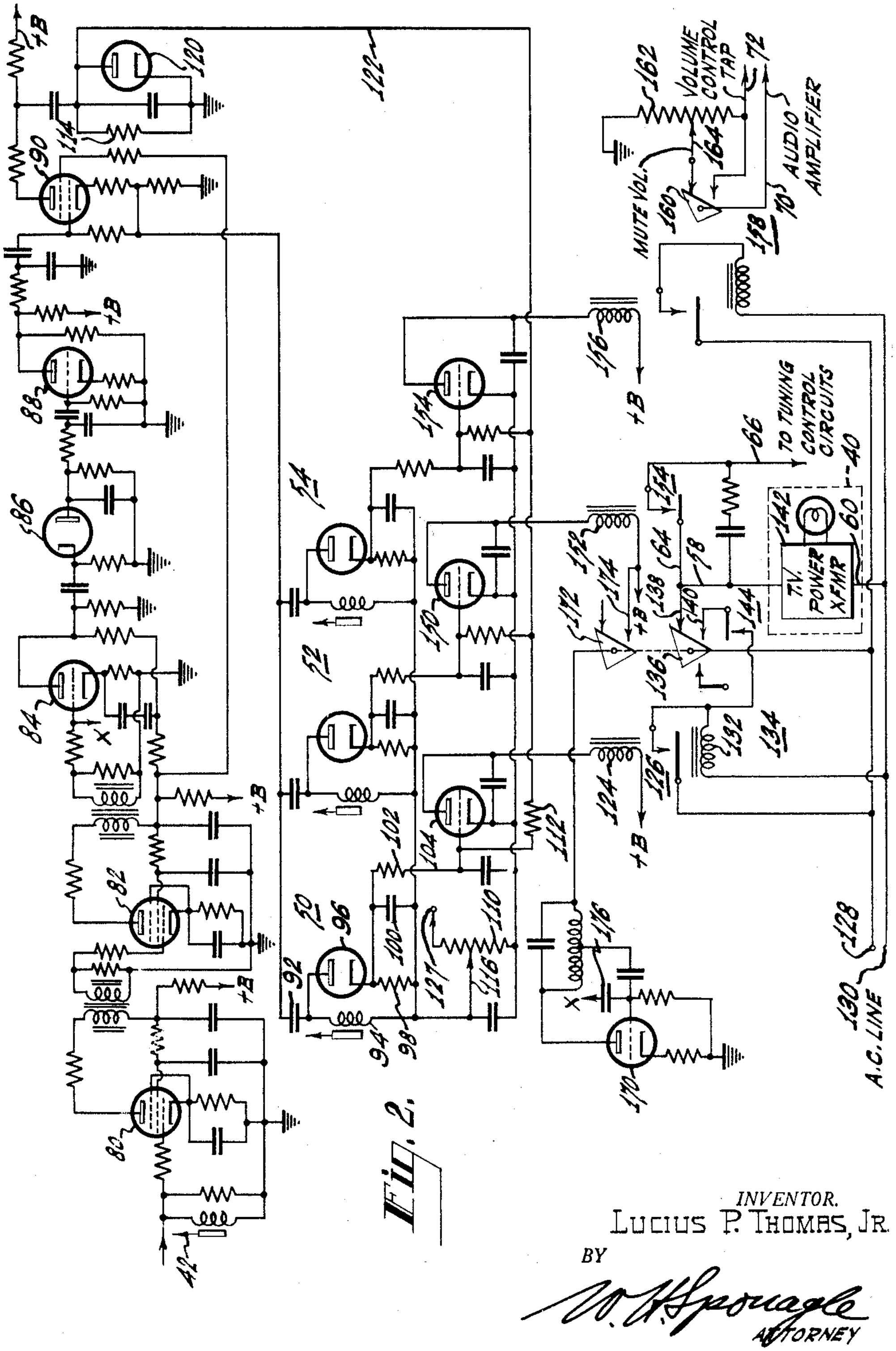

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawing in which:

Figure 1 is a schematic circuit diagram in block form of a wireless remote control system in accordance with the invention for controlling a television receiver; and Figure 2 is a more detailed schematic circuit diagram of the remote control signal receiver of Figure 1 embodying further features of the invention.

Referring now to the drawings, and particularly to Figure 1, the remote control system of the invention includes a transmitter 10 for generating and transmitting control signal waves of predetermined frequencies. By way of example, the transmitter may include an oscillator, not shown, which may be simultaneously energized and tuned to any one of three discrete frequencies by manually depressing one of the control buttons 12, 14 or 16. The control signal wave, which may have a frequency of 16.750 kc., 17.750 kc. or 18.750 kc. respectively depending on which of the push buttons are depressed, is radiated by a transmitting antenna 18.

The remote control system including the transmitter 10 is adapted to control a television receiver which includes an antenna 20 for intercepting television signals in the very high or ultra high frequency television bands. The antenna 20 is coupled to a conventional step-by-step tuner 22 which includes tuning circuits including a movable tuning element for selecting any one of a plurality of television channels. A tuning control motor and control circuits 24 therefor are provided for adjusting the movable tuning element of the tuner 22 to effect the desired channel selection.

A selected television signal is heterodyned with a local oscillator wave generated in the tuner 22 to provide a corresponding signal of intermediate frequency. This intermediate frequency signal is then amplified and detected in the intermediate frequency amplifier and video detector circuits 26. The signal output from the video detector includes a composite video television signal and a 4.5 mc. component which results from the heterodyning of the sound and picture carrier waves through the preceding amplifier stages. The 4.5 mc. component is then fed to the sound I.F. amplifier and detector 28 to derive the audio portion of the received signal. The demodulated audio signal is further amplified in the audio frequency amplifier 30 before being applied to a sound reproducing device 32. Volume control means such as a potentiometer, not shown, are provided in the audio amplifier 30 for controlling the intensity of the sound from the reproducing device 32.

The composite video signal from the video detector is amplified in the video amplifier 34 before application to a picture reproducing tube 36. The composite video signal is also applied to the deflection control circuit 38 which includes means for separating and utilizing the synchronizing signal components of the composite video wave to control the deflection of a cathode ray beam in the picture reproducing tube 36. More specifically, the deflection control circuits 38 include a horizontal oscillator (not shown) operating at the standard frequency of 15.750 kilocycles when properly synchronized for controlling the horizontal deflection of the cathode ray beam, and a vertical oscillator for controlling the vertical deflection or field scanning rate.

The various stages of the television receiver are suitably connected to the receiver power supply 40 by connections not shown. The power supply 40 is connected to an A.C. power main and is operative to convert the A.C. line voltage into the necessary A.C. and D.C. voltages required for the proper operation of the receiver.

The remote control system shown in the drawings is designed to control three functions of a television receiver. The first of these functions is the receiver on-off control, which controls the application of power from the A.C. supply mains to the receiver. The second of these control functions is that of receiver tuning. This is effectively accomplished by selectively energizing a motor which is mechanically coupled to drive the movable tuning element of the tuner 22. The third function is an audio mute circuit which is effective to eliminate or reduce the audio level by a predetermined amount. It is to be understood that other control functions could be added by increasing the number of control circuits without departing from the scope of the present invention.

In order to actuate any of the above functions at the remote location, one of the push buttons 12, 14 or 16 is depressed to cause a control signal wave of the proper frequency to be radiated by the transmitting antenna 18. The radiated control signal wave is intercepted by the remote control receiver antenna 42 and applied to an R.F. amplifier 44. After amplification by the R.F. amplifier 44, the control signal is heterodyned in a mixer circuit 46 with one of the stray signals radiated by the television receiver. As shown diagrammatically in Figure 1, the stray radiations emanate from the deflection control circuits 38 of the television receiver, and comprise radiations from the horizontal oscillator circuit which conventionally operates at a frequency of 15.750 kc.

The heterodyning of the received control signal wave with the horizontal oscillator radiated signal in the mixer circuit 46 produces a beat frequency signal which is amplified in a low frequency amplifier 48 prior to its application to a plurality of frequency selective circuits 50, 52 and 54. The frequency selective circuit which is tuned to the frequency of the beat signal produces a control voltage for triggering the control circuit connected therewith.

A power control circuit 56 is responsive to a predetermined control voltage from the frequency selective circuit 50 to apply line voltage to the television receiver power supply 40 over the conductors 58 and 60. Similarly, a tuning control circuit 62 is responsive to a control voltage from the frequency selective circuit 52 to complete the power circuit for a tuning control motor 24 by way of the conductors 64 and 66. Once the tuning control motor is energized, the motor control circuits are designed to keep the motor power circuit completed until the next preselected channel is tuned in. In a like manner, the audio control circuit 68 is responsive to a control voltage from the frequency selective circuit 54 to mute the receiver sound. The audio control circuit 68 is connected to the audio frequency amplifier 30 of the television receiver by way of the conductors 70 and 72 to effect this function in a manner to be explained hereinafter. The various stages of the remote control receiver are connected to a separate power supply 69 for the remote control receiver by connections not shown. The power supply 69 is connected to the A.C. power mains and is operative to convert the A.C. line voltage into the necessary A.C. and D.C. voltages required for the proper operation of the remote control receiver.

Referring to Figure 2 which schematically illustrates the remote receiver in greater detail, the radiated control signals are intercepted up by the antenna 42 which may comprise a ferrite loop antenna. Signals induced in the antenna 42 are applied to the bandpass amplifier stages 80, 82 and 84 which are responsive to signals in the entire band of frequencies to be received. In the present case the bandpass of the amplifier stages 80, 82 and 84 extends from slightly less than 15.750 kilocycles to slightly more than 18.750 kilocycles which are the lowest and highest frequencies of the transmitted control signals and the radiated horizontal oscillator signal. Sufficient selectivity is provided so that signals of a frequency falling substantially outside this frequency range will be effectively rejected.

A detector 86 is coupled to the output circuit of the third amplifier stage 84. When a control signal is received together with the stray radiations from the deflection control circuits 38 (Figure 1), the detector 86 serves to derive a beat frequency signal corresponding in frequency to the difference in frequency between these two signals. The resulting beat frequency signal is then further amplified by the low frequency amplifiers 88 and 90.

The amplifier 90 is connected as a cathode follower to drive the three frequency selective circuits 50, 52 and 54 each of which is responsive to signals of a different frequency to produce a control voltage. This control voltage, in turn, is used to trigger the desired control function. Since each of the frequency selective circuits is essentially the same, with the exception of the tuning of the resonant circuit elements therein, only the frequency selective circuit 50 will be described in detail. It should be noted here that the frequency selective circuit 50 produces a control signal for controlling the receiver on-off. Accordingly, this circuit is responsive to 1 kc. beat signal which is the difference between the 15.750 kc. horizontal oscillator signal and the 16.750 kc. signal produced when the on-off button 12 is depressed. The frequency selective circuits 52 and 54 control the channel selection and audio muting circuits respectively and are tuned to 2 and 3 kc. respectively. From the foregoing it will be seen that 2 and 3 kc. are the beat frequencies produced when the push-buttons 14 and 16 are depressed.

The resonant circuit elements of the frequency selective circuit 50 comprise a capacitor 92 and an inductor 94 which as mentioned above are tuned to series resonance at 1 kc. This circuit further includes a rectifier 96 and a resistor 98 which are connected in series across the inductor 94. When a 1 kc. signal is applied to the frequency selective circuit 50, a relatively large voltage is developed across the inductor 94. This voltage is rectified by the rectifier 96 causing a D.C. voltage to be developed across the resistor 98 such that the cathode of the rectifier 96 becomes more positive. The voltage appearing at the cathode of the rectifier 96 is filtered by a capacitor 100 and is applied through a resistor 102 to the input circuit of a keying amplifier including a triode electron tube 104. This positive control voltage triggers the normally blocked keying amplifier 104 into conduction.

The negative biasing voltage which blocks the amplifier 104 is provided by a voltage divider connected between ground and a point of negative potential indicated by the terminal 108. The voltage divider itself comprises a portion of the potentiometer 110, three series resistors 98, 102 and 112 taken in parallel with the corresponding three resistors in the other frequency selective circuits 52 and 54, and a resistor 114. The resistance values of the various resistors and the magnitude of the negative voltage at the terminal 127 are selected to provide a cut-off voltage for the various keying amplifiers such as the triode 104. However, the particular threshold level at which these amplifiers begin to conduct is controlled by the position of a movable tap 116 along the potentiometer 110.

Additional negative bias potential for the keying amplifiers is provided by the rectifier 120 which is connected in the anode output circuit of the low frequency amplifier 90. The circuit including the rectifier 120 is essentially a detector for developing a voltage proportional to the amplitude of any low frequency signal reaching the low frequency amplifier 90. The negative voltage which is developed across the resistor 114 is applied by way of the conductor 122, to the input circuits of the various keying amplifiers. This voltage is combined with the fixed negative voltage to drive the keying amplifiers further into cut-off when a signal is applied to the amplifier 90.

When the keying amplifier 104 is triggered into conduction by the positive voltage from the rectifier 96, a relay winding 124 which controls the opening and closing of the contacts 126 is energized. The relay contacts 126 in turn are connected in circuit to control the application of energizing voltage such as 115 v. A.C. from the terminals 128 and 130 to the winding 132 of a bistable relay 134. The bi-stable relay 134, as the name implies, moves to a first position when power is applied to the winding 132 so that the movable contact 136 engages the fixed contact 138. After the power is removed by the opening of the contacts 126, the bi-stable relay contacts remain in this position. When the relay 134 is energized a second time the movable contact 136 thereof moves to a second position to engage the fixed contact 140, and remains there after power is removed from the winding 132. Upon successive energizations of the winding 132, the movable contact 136 moves back and forth between the fixed contacts 138 and 140 as described.

When the movable contact 136 of the bi-stable relay 134 is in engagement with the fixed contact 138, power is supplied to the television receiver power supply 40 over the conductors 58 and 60. In Figure 2, the television receiver power supply is indicated by the power transformer 142 within the rectangle 40. One side of the transformer 142 is permanently connected to the terminal 130 of the A.C. supply, and the other side of the transformer is connected to the terminal 128 of the A.C. supply through the contacts 138 and 136. When the movable contact 136 engages the fixed contact 140, the A.C. power circuit to the television receiver is broken. A switch 144 is provided for turning the receiver on at the remote location. When the contacts 136 and 140 are in engagement, the power circuit to the television receiver is broken as mentioned above. However, these contacts together with the switch 144 complete the power circuit for the winding 132 of the bi-stable relay 134. Thus, by closing the switch 144, power from the A.C. terminals 128 and 130 is applied to the bi-stable relay causing the movable contact 136 to engage the fixed contacts 138, thereby completing the receiver power circuit.

It will be noted that when the television receiver is in the off position, the horizontal oscillator circuits will be deenergized and accordingly there is no heterodyning signal available for producing the necessary beat signal by which the receiver may be returned to the on condition. To supply the necessary heterodyning signal, a blocking oscillator 170 which is similar in construction to the blocking oscillators commonly used as horizontal deflection generators in television receivers, is provided at the remote control receiver. The blocking oscillator 170 is energized to provide the heterodyning signal only when the television receiver is in the off position. To this end the bi-stable relay 134 is provided with auxiliary contacts 172 and 174. When the television receiver is in the off position the contacts 172 and 174 are in engagement to complete the connection between the operating potential supply +B supplied by the remote control receiver power supply, and the blocking oscillator circuit 170. In the on condition of the receiver, the connection between the elements 172 and 174 is broken, thereby deenergizing the blocking oscillator 170.

When the blocking oscillator 170 is energized, the signals appearing at the grid thereof are coupled through a capacitor 176 of the control electrode of the amplifier 84. Although no physical contacts are shown between these two points, a conductor is actually connected between the point X in the blocking oscillator circuit 170 and point X in the amplifier circuit 84.

The frequency selective circuit 52 for the channel selection or tuning control circuit 62 is responsive to a beat signal having a frequency of 2 kc. and controls a keying amplifier 150. Conduction by the amplifier 150 energizes a relay 152 causing the contacts 154 thereof to close, thereby completing the tuning control motor circuits 24 power circuit by way of the conductors 64 and 66. The motor circuit is designed so that auxiliary circuits (not shown) continue to apply power to the motor after the initial energization so that the motor continues to rotate until the next channel is selected. The auxiliary motor control circuit may be of any well known type, such as that used in the RCA Model 21–RD–8525 television receiver.

The frequency selective circuit 54 for audio muting control is tuned to 3 kc., and produces a control voltage in response to a beat signal of that frequency to trigger the keying amplifier 154. When the amplifier 154 conducts, a relay 156 in the plate circuit thereof is energized, causing power to be applied to a bi-stable relay 158. The movable contact 160 of the bistable relay 158 in the alternate position from that shown, connects the movable tap on a volume control potentiometer (not shown), via the conductors 70 and 72 directly to the audio amplifier 30 input circuit as is conventional. In this position, the television receiver sound is normal. In the second position of the movable contact 160, a potentiometer 162 is connected between the volume control movable tap and ground, and the movable tap 164 on the potentiometer 162 is connected to the audio amplifier input circuit. In this manner, the audio level may be reduced by a predetermined amount as controlled by the setting of the tap 164 on the potentiometer 162, when a beat frequency signal of 3 kc. is produced in the receiver.

In the operation of a remote control system without the circuitry of the invention it should be noted that even though the control signal frequencies are not particularly near the horizontal oscillator frequency, this signal may seriously interfere with the operation of the remote control system. For example when the receiver is turned on or off, the horizontal oscillator frequency may sweep through the control frequency range. Furthermore, if the receiver for some reason goes out of synchronism, the horizontal oscillator may operate at or near the frequencies of the control signals. Thus, if the receiver is turned off from the remote location, the horizontal oscillator frequency may sweep through the on-off control signal frequency, turning the receiver back on.

In accordance with the invention this problem is materially reduced, since the interfering spurious radiation, which in the present case is the horizontal oscillator radiation is used as the control receiver heterodyning signal. Thus, if the horizontal oscillator departs from the normal synchronized condition, there is no erroneous actuation of the control circuits.

In the operation of the receiver embodying the invention, the control signal and the horizontal oscillator signal are heterodyned together to produce a beat frequency signal. The beat frequency signal is amplified, and applied to the frequency selective circuits 50, 52 and 54 as well as to the rectifier 120. Since the selectivity of the circuits 50, 52 and 54 is not perfect, some positive voltage will be developed by each for application to the keying amplifiers. However, the circuit which is tuned to the frequency of the beat signal will produce a much larger positive voltage due to the gain through the series resonant circuit. At the same time a negative voltage proportional to the amplitude of the received signal is developed in the rectifier 120 circuit. This voltage which is applied together with the fixed negative bias and the positive control voltages to the control electrodes of the keying amplifiers is sufficiently negative to overcome the small positive voltage produced by the control circuits due to imperfections in the selectivity characteristics thereof, but is not sufficient to overcome the larger positive control voltage from the circuit which is tuned to the beat frequency signal. This feature insures that only the proper control function will be energized by any given beat signal. As mentioned above due to the gain of the series resonant circuit tuned to the frequency of the beat signal, this positive voltage is of sufficient amplitude to drive a keying amplifier into conduction, thereby energizing the relay associated therewith.

The rectifier circuit 120 has the additional advantage of increasing the negative bias applied to the keying amplifiers in the presence of random noise energy. Aside from the fact that it is unlikely that two random signals of sufficient amplitude and duration to trigger the keying amplifiers would occur simultaneously, the increased negative bias applied to the keying amplifiers materially reduces the susceptibility of the system to erroneous triggering as a result of this noise. This is because several cycles of signal energy at the proper frequency are required to build up a large voltage in the high Q series resonant circuits. Since the noise is random in nature, it is unlikely that a noise signal of the proper duration to trigger the keying amplifiers will occur, and any small positive voltages built up as a result of the noise will be overcome by the negative voltage from the rectifier 120.

Having described my invention, what is claimed is:

1. A receiving system comprising in combination, means providing an amplifying channel, at least one frequency selective circuit coupled to said channel, said frequency selective circuit operable to produce a first control voltage in response to signals of the frequency to which said frequency selective circuit is tuned, a control circuit coupled to said frequency selective circuit and actuatable between at least two different operating conditions in response to said first control voltage, means coupled to said amplifying channel means for providing a second control voltage in response to signals amplified by said channel, and means for applying said second control voltage to said control circuit in a manner to oppose its actuation.

2. A remote control receiver comprising in combination, signal receiving means, a plurality of frequency selective circuit means each tuned to a different frequency coupled to said receiving means and responsive to signals of different frequencies to produce a control voltage, a plurality of control circuit means each individually coupled to one of said frequency selective circuit means, said control circuit means responsive to said control voltage to be actuated between one of two different operating conditions, detector means coupled to said receiving means and responsive to any of said different frequencies to produce a second control voltage, and means for applying said second control voltage to each of said control circuit means in a manner which tends to prevent actuation thereof.

3. A remote control receiver responsive to transmitted control signals in a predetermined frequency range to actuate control circuit comprising in combination, signal receiving means including an amplifier having a frequency passband including said predetermined frequency range, output circuit means for said amplifier, a plurality of frequency selective circuit means each including a rectifier coupled to said output circuit means, each of said frequency selective circuits responsive to different frequency control signals to produce a control voltage, a plurality of control circuit means respectively coupled to different ones of said frequency selective circuit means, said control circuit means responsive to said control voltage to be actuated between one of two different operating conditions, detector means coupled to said output circuit means and responsive to signals in said predetermined frequency range to produce a second control voltage, and means for applying said second control voltage to each of said control circuit means in a manner which tends to prevent actuation thereof.

4. A remote control receiver responsive to transmitted control signals in a predetermined frequency range to actuate control circuits comprising in combination, signal receiving means including an amplifier having a frequency passband including said predetermined frequency range, output circuit means for said amplifier, a plurality of frequency selective circuit means each including a rectifier coupled to said output circuit means, each of said frequency selective circuits responsive to different frequency control signals to produce a first control voltage, a corresponding plurality of control circuit means each including an electron tube having a control electrode and an anode, biasing means connected with each of said control electrodes for maintaining said electron tubes in a normally non-conductive state, means coupling the control electrode of each of said electron tubes with a different one of said frequency selective circuits so that a first control voltage produced by one of said frequency selective circuits causes conduction through the electron tube connected therewith, a plurality of relay devices each connected with the anode of different one of said electron tubes, each of said relay devices responsive to current through the tube with which it is connected to actuate one of said control circuits, rectifier means coupled with said output circuit means and responsive to signals in a wider portion of said predetermined frequency range than is selected by said frequency selective circuits to produce a second control voltage, and means for applying said second control voltage to each of said control electrodes in a polarity direction which tends to prevent conduction in said electron tubes, said second control voltage being of less magnitude than said first control voltage produced by any of said frequency selective circuits.

5. In a remote control system for controlling apparatus radiating stray electrical signals of a frequency conditionally corresponding to those of control signals to be used for control of said apparatus, the combination comprising receiving means responsive to at least one of said stray electrical signals and said control signals, detecting means in said receiving means for deriving a beat frequency signal from a received control signal and a stray electrical signal, and means responsive to said beat frequency signal for effecting a predetermined control of said apparatus.

6. In a remote control system for television receivers of the type having horizontal deflection signal generating means which produces radiation of said horizontal signals, a remote control receiver including means providing an input circuit responsive to any one of a plurality of transmitted control signals and to said radiated horizontal deflection signals, a beat frequency detector coupled with said input circuit for heterodyning a received one of said control signals with said horizontal deflection signals to derive a beat frequency signal, and means responsive to said beat frequency signal connected with said detecting means for controlling an electrical circuit associated with said television receiver.

7. In a remote control system for controlling the application of power to television receivers of the type having horizontal deflection signal generating means which produces radiation of said horizontal signals, a remote control receiver including means providing an input circuit responsive to any one of a plurality of transmitted control signals and to said radiated horizontal deflection signals, detecting means coupled with said input circuit for heterodyning a received one of said control signals with said horizontal deflection signals to derive a beat frequency signal, means responsive to said beat frequency signal connected with said detecting means for controlling the application of power to said television receiver, means providing an oscillator operating at the frequency of said horizontal deflection signal generating means in said remote control receiver, and means for energizing said oscillator means in said remote control receiver when power is not applied to said television receiver.

8. A remote control receiver responsive to any one of a plurality of transmitted control signals of different frequency for selectively controlling the operation of controlled apparatus, comprising, signal receiving means including an amplifier having a frequency bandpass including the frequencies of said plurality of control signals, a plurality of controlled circuits actuatable between one of two operating conditions, frequency selective circuit means included in said signal receiving means for coupling said amplifier to said controlled circuits and responsive to the specific frequency of a control signal applied thereto from said amplifier to selectively actuate a particular one of said plurality of controlled circuit from one of its two operating conditions to the other condition thereof, means providing a detector circuit coupled to said amplifier and responsive to signals in a wider portion of said frequency amplifier passband than is covered by any of said controlled signals individually to derive a control signal, and means for applying said controlled signal to said signal receiving means in a manner tending to counteract the actuation of said controlled circuits.

9. In a remote control receiver of the type responsive to any one of a plurality of transmitted waves of different frequency to selectively control the operation of a plurality of controlled circuits between one of two operating conditions, and of the type including an amplifier having a frequency passband including the frequencies of said plurality of transmitted waves and frequency selective circuit means coupled to said amplifier and having a plurality of output terminals each respectively coupled to a different one of said controlled circuits, said frequency selective circuit means being responsive to a transmitted wave to develop a control voltage at a particular one of said output terminals determined by the particular frequency of the transmitted wave to actuate the controlled circuit connected with that output terminal from one of is two operating conditions to the other operating condition thereof; the combination of means providing a detector circuit coupled to said amplifier and responsive to derive an output voltage from signals in a wider portion of said frequency amplifier passband than is covered by any of said transmitted waves individually, and means for applying said output voltage to said remote control receiver in a manner tending to reduce the effective amplitude of a control voltage developed at said output terminals by said frequency selective circuit means.

References Cited in the file of this patent

UNITED STATES PATENTS

| | | |
|---|---|---|
| 2,404,101 | Shock | July 16, 1946 |
| 2,429,771 | Roberts | Oct. 28, 1947 |
| 2,541,329 | Boosman | Feb. 13, 1951 |